United States Patent
Noguchi

(10) Patent No.: US 7,512,056 B2
(45) Date of Patent: Mar. 31, 2009

(54) OBJECTIVE LENS FOR OPTICAL PICK-UP DEVICES, OPTICAL PICK-UP DEVICES, AND OPTICAL INFORMATION RECORDING AND/OR REPRODUCING APPARATUS

(75) Inventor: Kazutaka Noguchi, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 743 days.

(21) Appl. No.: 11/217,289

(22) Filed: Sep. 2, 2005

(65) Prior Publication Data

US 2006/0077790 A1 Apr. 13, 2006

(30) Foreign Application Priority Data

Sep. 7, 2004 (JP) .............................. 2004-259726

(51) Int. Cl.
*G11B 7/00* (2006.01)

(52) U.S. Cl. ............................................... 369/112.01

(58) Field of Classification Search ............ 369/112.01, 369/112.02, 112.03, 44.23, 44.24, 112.23, 369/112.13, 112.26
See application file for complete search history.

(56) References Cited

U.S. PATENT DOCUMENTS

| 4,557,567 | A | 12/1985 | Azumi et al. |
| 7,319,655 | B2 * | 1/2008 | Kimura ................. 369/112.01 |

FOREIGN PATENT DOCUMENTS

| EP | 1 329 881 A2 | 7/2003 |
| EP | 1 359 574 A2 | 11/2003 |
| EP | 1 469 465 A2 | 10/2004 |
| EP | 1 521 248 A2 | 4/2005 |
| JP | 2001-194581 | 7/2001 |
| JP | 2003-248956 | 9/2003 |

* cited by examiner

*Primary Examiner*—Nabil Z Hindi
(74) *Attorney, Agent, or Firm*—Finnegan, Henderson, Farabow, Garrett & Dunner, L.L.P.

(57) ABSTRACT

The present invention provides an objective lens for optical pick-up devices in which the amount of change in the astigmatic aberration is small when there is a temperature distribution that is not circularly symmetric with respect to the optical axis within an objective lens constructed with at least two optical elements and which permits stable and high-speed information recording and reproduction with high-density optical disks, and to provide further an optical pick-up device provided with such an objective lens, and an optical information recording and/or reproducing apparatus employing such an optical pick-up device.

23 Claims, 9 Drawing Sheets

OPTICAL AXIS

OPTICAL AXIS

OPTICAL AXIS

OPTICAL AXIS

OBJECTIVE LENS FOR OPTICAL PICK-UP DEVICES, OPTICAL PICK-UP DEVICES, AND OPTICAL INFORMATION RECORDING AND/OR REPRODUCING APPARATUS

RELATED APPLICATION

This application is based on Japanese Patent Application No. 2004-259726 filed in Japan, the entire content of which is hereby incorporated by reference.

BACKGROUND

1. Field of the Invention

The present invention relates to objective lens for optical pick-up devices, optical pick-up devices, and optical information recording and/or reproducing devices.

2. Description of the Related Art

In the recent years, due to high densities of optical disks (optical information recording media), the objectives lenses with high numerical aperture (NA) numbers are being used in order to meet the demand for making the light focus spot smaller in the optical pick-up devices used for recording and/or reproducing information in optical disks.

For example, in an optical pick-up device for high-density optical disks using a blue-violet semiconductor laser at a wavelength of 405 nm as the light source, it has been proposed to use a numerical aperture number NA of 0.85 in order to achieve high density.

As an objective lens with an NA of 0.85, a 2-component plastic lens has been proposed in Japanese Unexamined Patent Application Laid Open No. 2003-248956 in which the refractive force on the incident light beam is divided between two lenses and the NA of 0.85 is achieved by relaxing the manufacturing tolerances of the individual lenses, and in which the change in the spherical aberration due to heat radiated from the actuator or due to changes in the external temperature of the optical pick-up device has been suppressed to a small value.

In an optical pick-up device, generally, the focusing and tracking are carried out by moving the objective lens in the direction of the optical axis and in the radial direction of the disk by actuators. At that time, the objective lens is driven by passing a current through the focusing coil or through the tracking coil and by the resultant magnetic force between the magnetic field generated by the coil and a magnet.

However, when using a plastic for high NA number lens and driving the lens in the above manner, a problem occurs that has not been present in the previous structures. Since it is difficult in designing the actuators to provide or place the focusing coil or the tracking coil in a circularly symmetrical manner with respect to the optical axis of the objective lens, during the operations of the actuators, a temperature distribution that is not circularly symmetric with respect to the optical axis inside the objective lens, and as a consequence of that, the astigmatic aberration of the objective lens changes. In particular, when the objective lens has a structure with multiple components, since the refractive surface increases for an optical beam of NA 0.85, there is very small change in the heights at which the optical beam passes through within each of the respective objective lenses, and hence it is easily affected by the changes in the refractive index associated with the temperature distribution. In addition, if the speed of recording and/or reproducing information is made high, it will be necessary to pass large currents through the focusing coil and the tracking coil, which increases the heat generated by the coils. As a consequence, the changes in the astigmatic aberration mentioned above become large, which has bad effects on the optical disk recording and/or reproducing characteristics. Further, normally, even when the external diameter of the objective lens is large and its mass is also large, it is necessary to pass large currents through the focusing coil and the tracking coil, and hence the changes in the astigmatic aberration become large.

However, the technology disclosed in Japanese Unexamined Patent Application Laid Open No. 2003-248956 is a technology that compensates for the changes in the spherical aberration that occurs in an objective lens when the temperature distribution is uniform, and there is no mention there about the problem of deterioration in the astigmatic aberration caused by non-uniform temperature distribution within the objective lens, such as, for example, due to the heat generated by the current passed through the focusing coil or through the tracking coil as described above, and, of course, also no countermeasures have been taken for such problems in the technology disclosed in this document.

SUMMARY

The purpose of the present invention is to provide, with considerations given to the problem described above, an objective lens for optical pick-up devices in which the amount of change in the astigmatic aberration is small when there is a temperature distribution that is not circularly symmetric with respect to the optical axis within an objective lens constructed with at least two optical elements and which permits stable and high-speed information recording and reproduction with high-density optical disks, and to provide further an optical pick-up device provided with such an objective lens, and an optical information recording and/or reproducing apparatus employing such an optical pick-up device.

In the present patent specification, the term "high-density optical disk" is used as a collective designation for optical disks that use blue-violet semiconductor laser or blue-violet SHG laser as the light source for information recording and reproduction, and this term is taken to include, apart from optical disks (for example, Blu-ray disks, BD) with the standard that they carry out information recording and reproduction using an objective optical system with an NA of 0.85 and the thickness of the protective layer of the disk is about 0.1 mm, optical disks (for example, HD DVD) with the standard that they carry out information recording and reproduction using an objective optical system with an NA of 0.65 to 0.67 and the thickness of the protective layer of the disk is about 0.6 mm. In addition, this term is also taken to include not only the optical disks in which this protective layer is above the information recording surface but also optical disks that have a protective layer with thickness on the order of several nanometers to several tens of nanometers above the information recording surface but also optical disks in which the thickness of the protective layer or of the protective film is 0. Further, in the present patent specification, the high-density optical disks also include magneto-optical disks that use blue-violet semiconductor laser or blue-violet SHG laser as the light source for information recording and reproduction.

Further, in the present patent specification, the term DVD is taken as a generic designation for DVD type of optical disks such as DVD-ROM, DVD-Video, DVD-Audio, DVD-RAM, DVD-R, DVD-RW, DVD+R, DVD+RW, etc., and the term CD is taken as a generic designation for CD type optical disks such as CD-ROM, CD-Audio, CD-Video, CD-R, CD-RW, etc.

The above purpose of the present invention is achieved by each of the following inventions.

The objective lens for optical pick-up devices according to the first invention has the feature that it comprises a first optical element placed on the light source side and a second optical element having light focusing characteristics and placed on the optical information recording medium side, and satisfies the following Equation (1):

$$0.1 < D \times \tau < 6 \qquad (1)$$

where, $\tau$ [mm] is the spacing along the optical axis between the optical surface on said light source side of said first optical element and the optical surface on said optical information recording medium side, and D [mm] is the external diameter of said first optical element.

To start with, a definition is given of the temperature distribution of the objective lens in the present patent specification (see FIG. 5). When the actuator (not shown in the figure) is being driven (when current is passed through the coil), if the temperature at the apex point P1 of the first surface (the optical surface on the light source side of the first optical element L1) is denoted by T1 (° C.), the temperature at the apex point P2 of the fourth surface (the optical surface on the optical recording medium side of the second optical element L2) is denoted by T2 (° C.), and the temperatures at the points P3, P4, P5, and P6 at which an arbitrary line CL that is perpendicular to the optical axis and passes through the center point of the thickness of the lens of the first optical element L1 (the spacing of the optical surfaces along the optical axis) and a line CL' that is the line CL rotated by 90 degrees around the optical axis intersect the circumference of the joining member SE are denoted by T3 (° C.), T4 (° C.), T5 (° C.), and T6 (° C.), the highest temperature among T3 to T6 is denoted by TH, the lowest temperature is denoted by TL, and when the average temperature of T1 and T2 is denoted by TC, it is defined that "a non-uniform temperature distribution has occurred within the objective lens" when the temperature distribution TP in the circumferential direction and the temperature distribution TR in the radial direction satisfy either one of the two conditional Equations (6) and (7) below.

$$TP = |TH - TL| > 0.5 \qquad (6)$$

$$TR = |TH - TC| > 0.5 \qquad (7)$$

Further, the condition that "the temperature distribution within the objective lens is uniform" is the case when the Equations (6) and (7) are both not satisfied.

Further, all these temperatures shall be the values measured after the changes in the temperature distribution within the objective lens have gone into the steady state. In the present patent specification, the term "the temperature distribution within the objective lens has gone into the steady state" denotes the state in which the absolute value of the rate of change of temperature is 0.1° C./min or less at all the measurement points of P1 to P6 (see FIG. 5).

In addition, in the present patent specification, the term "objective lens" denotes a group of lenses comprising a focusing element that is placed at a position opposite to the optical disk in an optical pick-up device and that has the function of focusing the light beam emitted from the light source on to the information recording surface of the optical disk, or, in an optical pick-up device having compatibility with different types of optical disks, a focusing element that has the function of focusing a light beam emitted from a light source with different wavelengths on to the information recording surfaces of optical disks whose recording densities are different, and an optical element that is integrated with said focusing element and is driven for tracking or focusing via an actuator.

Further, the Numerical aperture NA in the present patent specification is denotes the image side numeric aperture of the objective optical system having the limiting diffraction performance with which it is possible to obtain the numerical aperture stipulated by the optical disk standard, or to obtain the spot diameter necessary for carrying out information recording and/or reproduction for the optical disk.

In the case of a high NA lens composed of several groups of elements with even the optical element placed on the light source side (the first optical element) having light focusing capability, compared to the optical element placed on the side of the optical information recording medium (the second optical element), the height of passage of the marginal light beam in the first optical element is higher. Therefore, a light beam of NA 0.85 is likely to get affected by the refractive index distribution of the objective lens associated with the temperature distribution.

In general, if the external diameter D of the first optical element is made large, the mass of the objective lens becomes large, there will be a need to pass a large current through the coil during focusing or tracking, and hence the quantity of heat generated increases.

According to the first invention, since it is possible to make small the optical path passing through the region where a non-uniform temperature distribution has been generated by making sure that the relationship between the external diameter D of the first optical element and the spacing $\tau$ along the optical axis is less than the upper limit given by the Equation (1), at the time of carrying out focusing or tracking an objective lens constituted by at least two or more elements, it is possible to suppress to a small value the astigmatic aberration generated due to the current passed through the focusing coil or through the tracking coil.

Further, when the relationship between the external diameter D of the first optical element and the spacing $\tau$ along the optical axis is made smaller than the lower limit given by the Equation (1), the first optical element becomes too thin, its strength becomes poor, and also its external diameter becomes large thereby making it not suitable for reducing the size of the pick-up device. On the other hand, the external diameter of the first optical element becomes small but it becomes unduly thick, and as a result, its weight increases thereby increasing the load on the actuators.

Thus, from the point of view of forming the optical element, it is desirable that the range of the external diameter D is 1 < D < 8 and the range of the spacing $\tau$ along the optical axis is 0.1 < $\tau$ < 3.0.

The objective lens for optical pick-up devices according to the second invention has the feature that it comprises a first optical element placed on the light source side and a second optical element having light focusing characteristics and placed on the optical information recording medium side, and satisfies the following Equation (2):

$$2.0 \times 10^{-6} < \tau \times |A| \times (h2/h1)^2 < 2.1 \times 10^{-4} \qquad (2)$$

where, $\tau$ [mm] is the spacing along the optical axis between the optical surface on said light source side of said first optical element and the optical surface on said optical information recording medium side, A is the amount of change in the refractive index of said first optical element for a 1° C. temperature raise from 25° C., h1 is the height from the optical axis of the marginal light beam at the optical surface on said light source side of said first optical element, and h2 is the height from the optical axis of the marginal light beam at the optical surface on said optical information recording medium side.

Normally, it is desirable that the amount of change A in the refractive index of said first optical element for a 1° C. temperature raise is as small a value as possible. Also, if the above τ is large, the optical path where non-uniform temperature distribution is present becomes longer. In other words, an inverse proportionality relationship exists between τ and A.

Further, the fact that $(h2/h1)^2$ becomes small corresponds to the refracted/diffracted light from the optical axis getting transferred from the region of large non-uniform temperature difference to a region where it is small at the optical surface on the light source side of said first optical element. Further, see FIG. 2 for explanation of h1 and h2.

Based on the above fact, the present inventors learnt from experimental results that it is possible to suppress to a small value the astigmatic aberration generated due to non-uniformity of the temperature distribution within the objective lens, even when a non-uniformity of the temperature distribution is generated within the objective lens, by making the relationship among τ, |A|, and $(h2/h1)^2$ within the upper limit of Equation (2).

Further, when the relationship among τ, |A|, and $(h2/h1)^2$ is made smaller than the lower limit of Equation (2), the first optical element becomes thick and the operating distance becomes short. Or else, the operating distance becomes long and the first optical element becomes thin thereby leading to problems in its strength.

Further, in the first invention, it is also possible to make sure that the above Equation (2) is satisfied.

Further, in the first and the second inventions, in addition, it is also possible to make sure that the following Equation (3) is satisfied.

$$0.52 < E/D < 0.97 \quad (3)$$

Where, E is the effective diameter of the optical surface of said first optical element on the light source side.

Making E and D (see FIG. 2) less than the upper limit of Equation (3) is equivalent to making small the ratio of the effective diameter to the external diameter of the lens, and corresponds to making large the distance from the focusing coil or the tracking coil which are the heat sources, and hence the non-uniformity of the temperature distribution within the optical functional section is reduced. Also, by making E and D larger than the lower limit of Equation (3), it is possible to prevent the external diameter of the objective lens from becoming too large.

Further, in the first and the second inventions, at least one of information recording and reproduction for said optical information recording medium is done by said optical pick-up device at x-times the normal speed, and it is also possible to make sure that the following Equation (4) is satisfied.

$$5.0 \times 10^{-6} < D \times \tau \times |A| < 2.1 \times 10^{-3} \quad (4)$$

Where A is the amount of change in the refractive index of said first optical element for a 1° C. temperature raise from 25° C.

In a normal optical pick-up device, in order to carry out information recording/reproduction at a speed that is several times faster than the normal speed, it is necessary to pass a larger current than at normal speed through the tracking and focusing coils, and hence the amount of heat generated in the coil becomes large. Here, the 1× speed is that at which the speed of scanning the information recording surface by the spot focused by the objective lens from the light being emitted by the light source (Reference scanning velocity) is 4.5 m/s to 6.6 m/s. Also, the x-times speed is the speed at which the spot scans the information recording surface x-times faster than the above 1× speed (Reference scanning velocity).

By making the relationship among D, x, τ, and A less than the upper limit of Equation (4), even when information recording/reproduction is carried out at x-times the normal speed if a non-uniform temperature distribution is generated within the objective lens, it is possible to suppress to a small value the astigmatic aberration caused by non-uniformity of temperature distribution within that objective lens, and hence it is possible to carry out the stable information recording/reproduction at a high speed for high-density optical disks.

By making the relationship among D, x, τ, and A smaller than the lower limit of Equation (4), the first optical element becomes too thin, its strength becomes poor, and also its external diameter becomes large thereby making it not suitable for reducing the size of the pick-up device. On the other hand, the external diameter of the first optical element becomes small but it becomes unduly thick, and as a result, its weight increases thereby increasing the load on the actuators.

Further, in the first and the second inventions, it is possible to have the second optical element made of glass.

By having the second optical element made of glass, it is possible to make the change in the refractive index due to non-uniform temperature distribution of the objective lens smaller than the case when the second optical element is made of plastic.

Further, in the first and the second inventions, it is also possible to have the first optical element made of plastic.

Further, in the first and the second inventions, it is also possible to have a phase structure for at least one of the optical surfaces of the first optical element.

From the point of view of forming, it is desirable to provide a phase structure in the optical element made of plastic.

Although, a phase structure can be used in order to compensate for the spherical aberration caused by differences in the protective layer thicknesses among a plurality of optical disks, when the optical pick-up device has compatibility with different types of optical disks, it is also possible to use it in order to compensate for color aberration caused by differences in the wavelengths used. Further, such color aberration refers to differences in the paraxial imaging positions caused by differences in the wavelength (axile color aberration), and/or refers to spherical aberration caused by differences in the wavelength.

The above phase structure can be either a diffraction structure or a structure assigning optical path difference. A diffraction structure can be, as is shown schematically in FIG. 6, constituted by a plurality of orbicular zones 100 with the cross-sectional shape including the optical axis being of the saw-tooth shape (diffraction structure—DOE), or as is shown schematically in FIG. 7, constituted by a plurality of orbicular zones 102 in which the directions of the steps 101 are the same within the effective radius with the cross-sectional shape including the optical axis being of the saw-tooth shape (diffraction structure—DOE), or, as is shown schematically in FIG. 8, constituted by a plurality of orbicular zones 105 in which the directions of the steps 104 change in the middle within the effective radius with the cross-sectional shape including the optical axis being of the saw-tooth shape (diffraction structure—DOE), or, as is shown schematically in FIG. 9, constituted by a plurality of orbicular zones 103 with stepped structure formed internally (superimposed refraction structure—HOE). Further, a structure assigning optical path difference can be, as is shown schematically in FIG. 8, constituted by a plurality of orbicular zones 105 in which the directions of the steps 104 change in the middle within the effective radius with the cross-sectional shape including the optical axis being of the stair-case shape (NPS). Further, although FIG. 7 to FIG. 9 show schematically the cases in which each phase structure is formed on a plane, it is also possible to form each phase structure on a spherical surface or a non-spherical surface. In addition, whether the structure is a diffraction structure or a structure assigning optical path difference, the structure can be like the one shown schematically in FIG. 8.

Further, it is also possible to have an optical pick-up device provided with an objective lens for optical pick-up devices according to the first and second inventions.

Also, it is also possible to provide the pick-up device with actuator for driving the objective lens.

Still further, it is also possible to mount the actuators in a non-circularly symmetrical manner with respect to the optical axis of the objective lens.

Further, it is also possible to have an optical information recording and/or reproducing apparatus which can carry out at least one among information recording and reproduction for optical information recording media while having the above optical pick-up device installed.

According to the present invention, it is possible to provide an objective lens for optical pick-up devices in which the amount of change in the astigmatic aberration is small when there is a temperature distribution that is not circularly symmetric with the optical axis within an objective lens constructed with at least two optical elements and which permits stable and high-speed information recording and reproduction with high-density optical disks, and to provide further an optical pick-up device provided with such an objective lens, and an optical information recording and/or reproducing apparatus employing such an optical pick-up device.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawing.

DESCRIPTION OF THE PREFERRED EMBODIMENT

In the following, although detailed descriptions are given of some preferred embodiments of the present invention with reference to the drawings, the present invention shall not be construed to be restricted to these embodiments.

Figure 1:
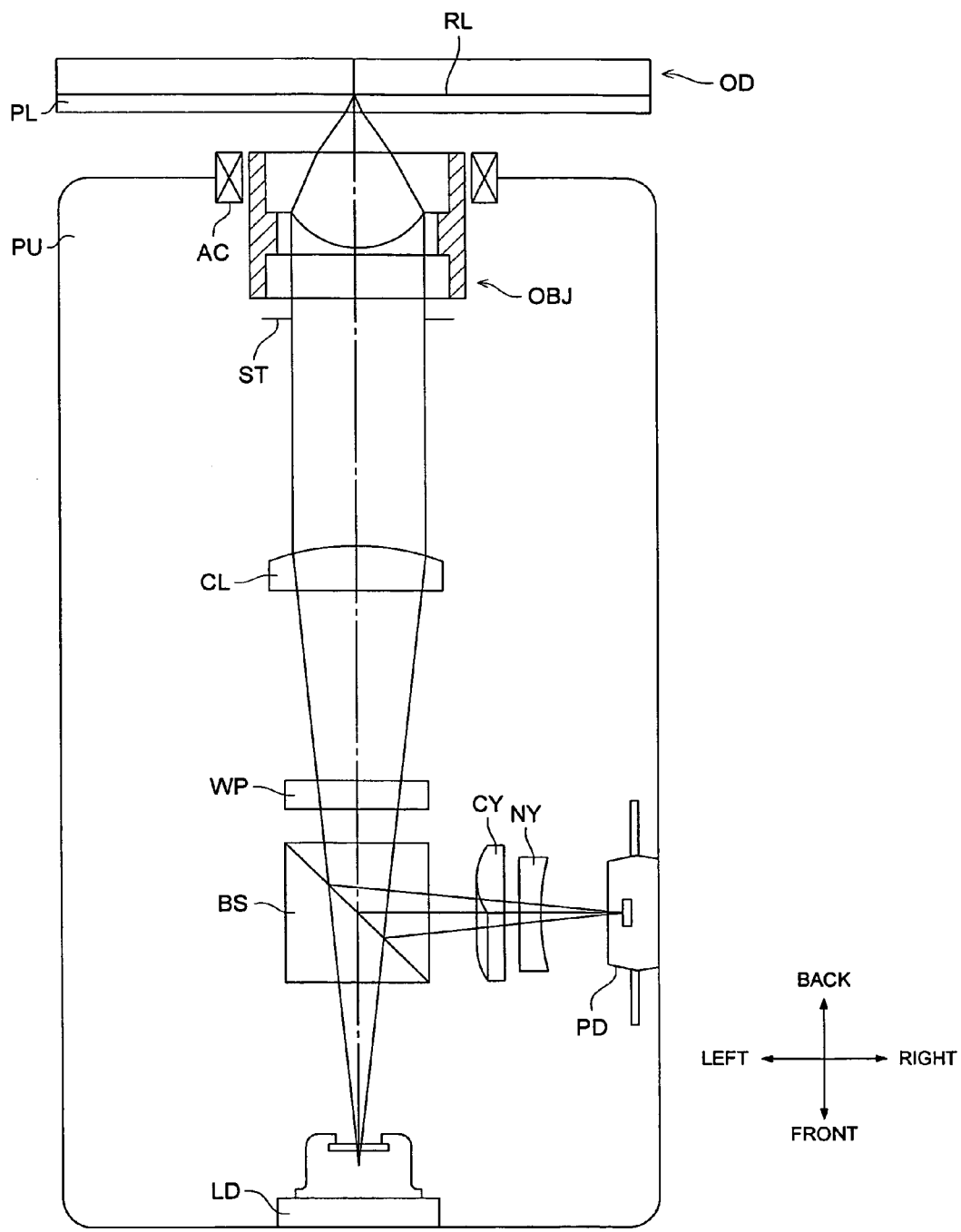
FIG. 1 is a plan view of the important sections showing the configuration of an optical pick-up device.

FIG. 1 is an outline diagram of an optical pick-up device according to the present preferred embodiment, and the optical pick-up device PU comprises a blue-violet semiconductor laser LD as the light source, a deflecting optical beam splitter BS, a ¼-wavelength plate WP, a collimator CL, an aperture ST, an objective lens OBJ, 2-shaft actuator AC for focusing and tracking, a cylindrical lens CY, a concave lens NL, and an optical power detector PD. Here, in the following explanations, for the sake of convenience, the direction towards the light source along the optical axis is referred to as "Front" and the direction towards the optical information recording medium is referred to as "Back".

The diverging optical beam emitted from the blue-violet semiconductor laser LD passes through the deflecting optical beam splitter BS, and after becoming a circularly polarized parallel light beam by passing through the collimator lens CL and the ¼-wavelength plate, has the optical beam diameter restricted by the aperture ST, and becomes a spot formed on the information recording surface RL via the protective layer PL of the high density optical disk OD due to the objective lens OBJ.

The reflected light beam modulated by the information pit at the information recording surface RL, again becomes a convergent light beam by passing through the objective lens OBJ, aperture ST, and collimator lens CL, after becoming a linearly polarized light by passing through the ¼-wavelength plate WP, gets reflected by the deflecting beam splitter BS and gets focused on to the optical power detector PD. After that, it is possible to read the information recorded in the high density optical disk OD using the output signal of the optical power detector PD.

Here, instead of the blue-violet semiconductor laser, it is possible to use a blue-violet SHG laser using the second harmonic generation method as the light source emitting a laser beam of wavelength of about 400 nm.

Figure 2:
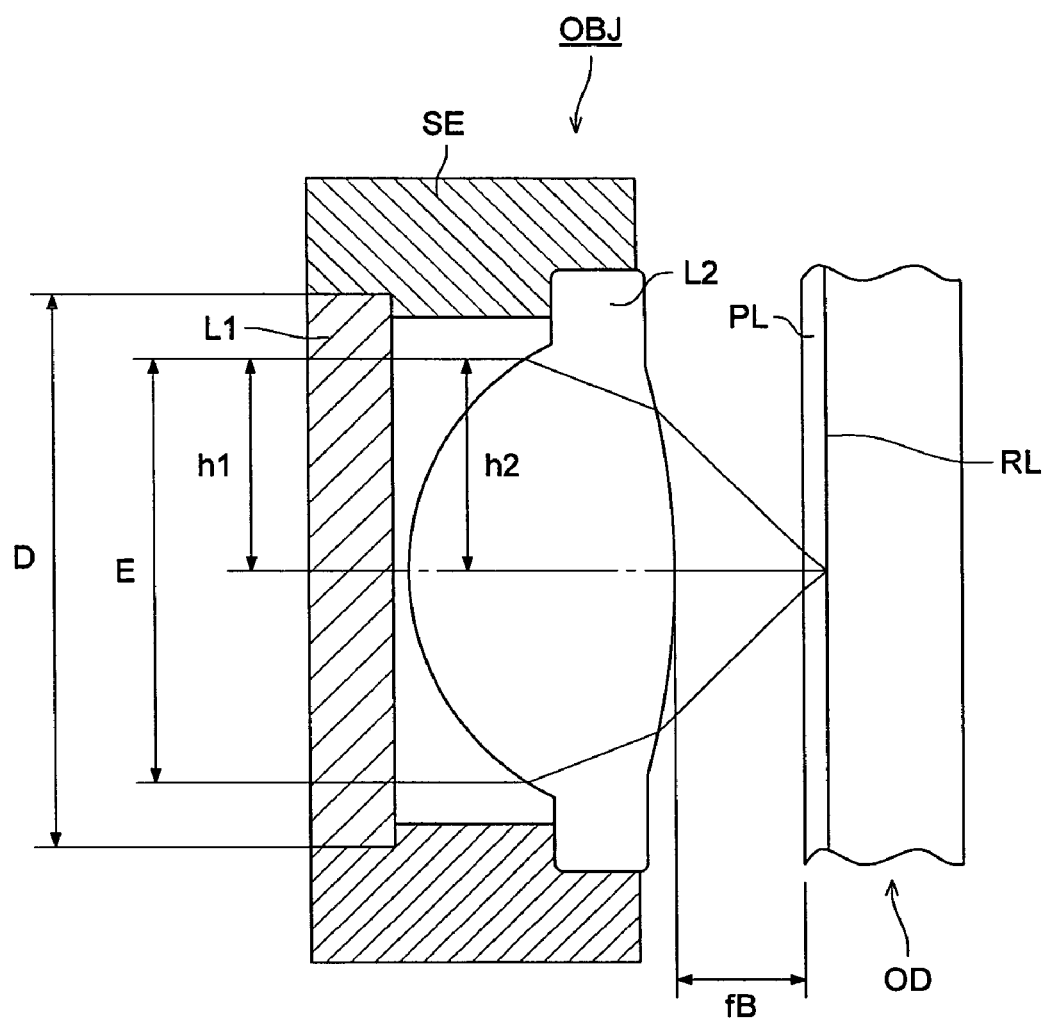
FIG. 2 is a side view of the important sections showing the structure of an objective lens.

As is shown in FIG. 2, the objective lens OBJ has the function of focusing the laser beam from the blue-violet semiconductor laser LD on to the information recording surface RL of the high density optical disk OD via the protective layer PL.

The objective lens OBJ has a 2-element construction comprising a plastic first optical element L1 that is placed on the side of the blue-violet semiconductor laser LD and that has inorganic particles of diameter 30 nm or less dispersed in a plastic, and a second optical element L2 having positive power and placed on the side of the high density optical disk OD, and the image side numerical aperture NA obtained by the combination of these two optical elements is 0.85.

Here, the objective lens OBJ used in the present invention can be anything as long as it has a construction with at least two or more elements, and is not restricted to only a 2-element construction such as that shown in FIG. 2.

In addition, because the first optical element L1 and the second optical element L2 are joined by a joining member SE, the focusing and tracking are carried out with the first optical element L1 and the second optical element L2 as an integrated unit.

Figure 3:
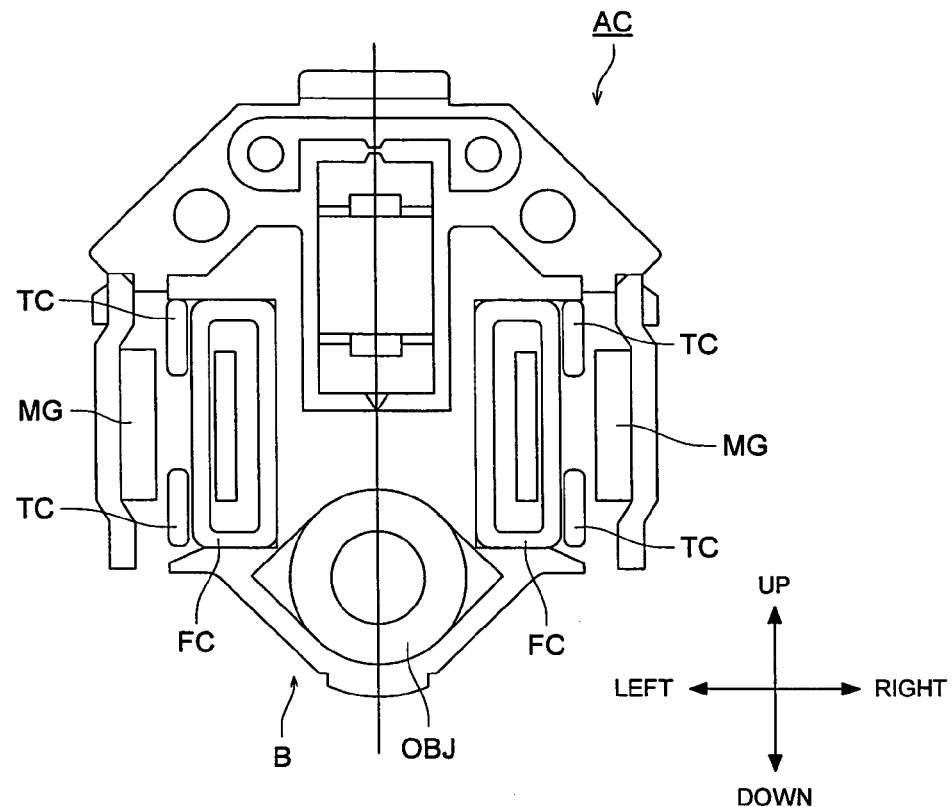
FIG. 3 is a plan view (a) of the important sections and a cross-sectional side view (b) of the important sections showing the structure of an actuator.
Figure 3:
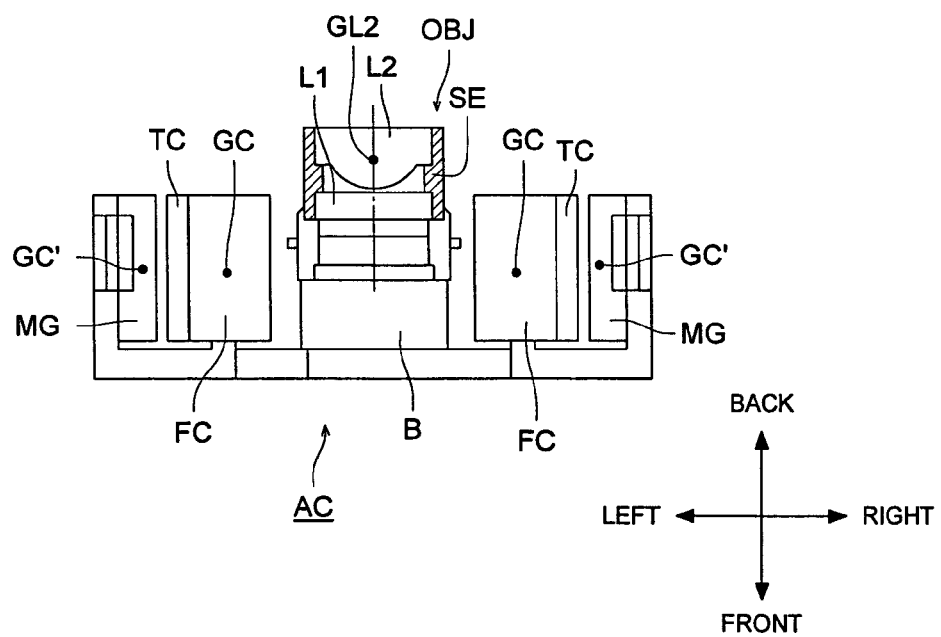

FIGS. 3(*a*) and (*b*) show the details in the neighborhood of the objective lens OBJ. The objective lens OBJ, under contact with the joining member SE, is retained by a bobbin B that is driven by the 2-shaft actuator AC. Here, explanation of the operation of the 2-shaft actuator AC is omitted because it is widely known. In addition, the symbol MG denotes a magnet.

Normally, from the point of view of acquiring the operating distance (working distance) objective lens OBJ, the focusing coil FC and the tracking coil TC are very frequently placed towards the front of the rear end of the objective lens OBJ (the light emitting surface of the second optical element L2 in the present embodiment), and also, the centers of gravity GC and GC' of the focusing coil FC and the tracking coil TC are positioned in the neighborhood of the mid-point of the length in the front-back direction of each coil.

Therefore, the focusing coil FC and the tracking coil TC are positioned so that their centers GC and GC' are located more towards the side of the blue-violet semiconductor laser LD than the center of gravity GL2 of the second optical element L2.

Therefore, during the operation of the optical pick-up device PU, although the temperature of the objective lens OBJ raises due to the influence of the heat generated from the focusing coil FC and the tracking coil TC, as shown in FIG. 3, since the focusing coil FC and the tracking coil TC are placed closer to the first optical element L1 than the second optical element L2 and also since they have been installed in a non-circularly symmetrical manner with respect to the optical axis of the objective lens OBJ, a non-circularly symmetrical temperature distribution is generated with respect to the optical axis within the objective lens OBJ (particularly within the first optical element).

However, since the design has been made so as to satisfy Equation (1) and Equation (2) above in the objective lens OBJ for optical pick-up devices according to the present invention, even when a non-uniform temperature distribution is generated within the objective lens OBJ, it is possible to suppress to small values changes in the astigmatic aberration, and hence it is possible to carry out stable information recording and reproduction at a high speed for the high density optical disk OD.

Further, when the effective diameter is taken as E and the external diameter is taken as D of the optical surface of the first optical element L1 on the side of the light source, it is desirable to design the first optical element L1 and the second optical element L2 so as to satisfy Equation (3).

Further, although not shown in the figure, it is possible to obtain an optical information recording and/or reproducing apparatus capable of carrying out at least one of recording optical information in an optical information recording medium OD and reproducing information recorded in an optical information recording medium OD by installing an optical pick-up device PU described above, a rotational drive unit that holds optical information recording medium OD in a free to rotate manner, and a control apparatus that controls the drive to each of these devices.

Next, explanation is given about objective lenses that are ideally suitable for use as the above objective lens. As has been described above, although a Blu-ray disk BD or an HD DVD can be used as a high density optical disk, the present embodiment assumes the use of a BD with an NA value of 0.65 and a protective layer thickness of 0.1 mm, and explanation is given of an objective lens that has compatibility between a BD and a DVD with an NA value of 0.65 and a protective layer thickness of 0.6 mm.

Figure 9:
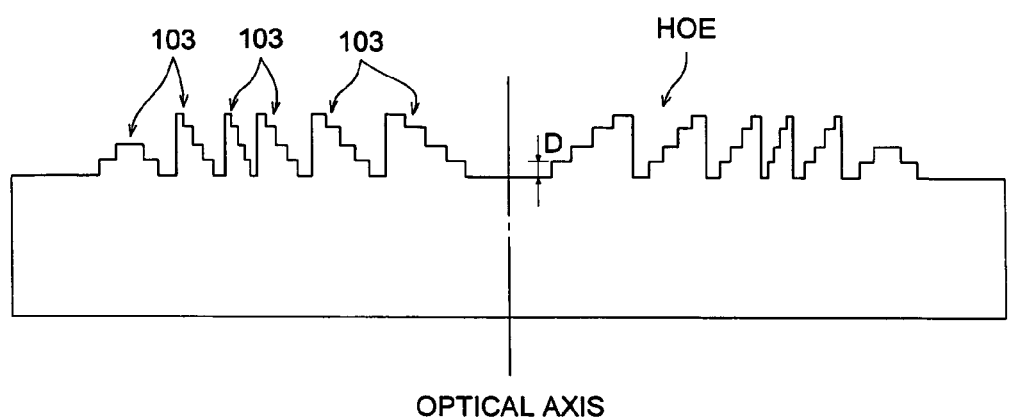
FIG. 9 is side views (a) and (b) showing an example of a phase structure.
Figure 9:
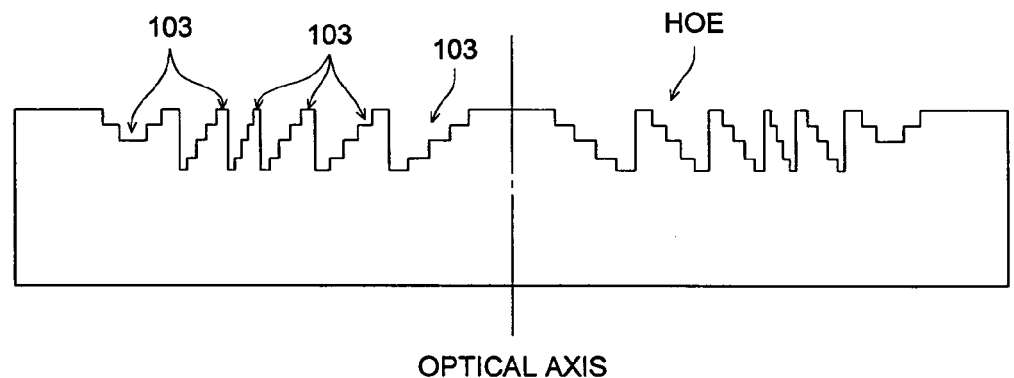

To begin with, objective lenses designed so that they do not satisfy Equation (1) and Equation (2) are shown in Table 1 and Table 2, and lenses designed so as to satisfy Equation (1) and Equation (2) are shown in Tables 3, 4, and 5. Since in each of these objective lenses a superimposed type diffraction structure such as the one shown in FIG. 9 is formed on the optical surface on the side of the light source of the first optical element, the $0^{th}$ order diffracted light intensity becomes a maximum at the wavelength of a BD, and the $+1^{st}$ order diffracted light intensity becomes a maximum at the wavelength of a DVD, it is possible to make small the changes in the spherical aberration generated due to the difference in the thickness of the protective layer of BD and DVD, the design has been made so that good information recording/reproduction is possible under the design conditions for the different standards of BD and DVD. In addition, in the case of all the objective lenses, the external diameter of the first optical element is 4.0 mm.

COMPARISON EXAMPLE 1

Optical Specifications:
BD: NA1=0.85, λ1=407.7 nm, f1=1.765, m1=0
DVD: NA2=0.65, λ2=660.0 nm, f1=1.825, m2=0

TABLE 1

| Paraxial data: | | | | | | | | |
|---|---|---|---|---|---|---|---|---|
| Surface No. | r | d1 | d2 | nλ1 | nλ2 | A[1/° C.] | Remarks | Material |
| 0 | — | ∞ | ∞ | — | — | | Light source | |
| 1 | ∞ | 2.00 | 2.00 | 1.621214 | 1.579616 | −1.4E−04 | First optical element | Plastic |
| 2 | ∞ | 0.31 | 0.31 | | | | | |
| 3 | 1.2146 | 2.10 | 2.10 | 1.604842 | 1.586051 | 2.6E−06 | Second optical element | Glass |
| 4 | −3.0684 | 0.53 | 0.32 | | | | | |
| 5 | ∞ | 0.10 | 0.60 | 1.621214 | 1.579616 | | Protective layer | |
| 6 | ∞ | — | — | — | — | | | |

| Aspherical coefficient | | |
|---|---|---|
| | Third surface | Fourth surface |
| κ | −6.5645E−01 | −9.8912E+01 |
| A4 | 1.6599E−02 | 1.5071E−01 |
| A6 | −1.0595E−03 | −2.6297E−01 |
| A8 | 1.0531E−02 | 3.7356E−01 |
| A10 | −9.6812E−03 | −3.7574E−01 |
| A12 | 2.9401E−03 | 2.0727E−01 |
| A14 | 3.9439E−03 | −4.7039E−02 |

TABLE 1-continued

| | | |
|---|---|---|
| A16 | −4.3872E−03 | 0.0000E+00 |
| A18 | 1.7585E−03 | 0.0000E+00 |
| A20 | −2.6260E−04 | 0.0000E+00 |

Order of diffraction, manufactured wavelength, optical path difference coefficient of first surface

| | |
|---|---|
| n'1/n'2 | 0/1 |
| λB | 660 |
| B2 | 7.1910E−03 |
| B4 | −2.1498E−03 |
| B6 | 2.8509E−04 |
| B8 | −6.4466E−04 |
| B10 | 1.0100E−04 |

COMPARISON EXAMPLE 2

Optical Specifications:

BD: NA1=0.85, λ1=407.7 nm, f1=1.765, m1=0
DVD: NA2=0.65, λ2=660.0 nm, f1=1.825, m2=0

TABLE 2

Paraxial data:

| Surface No. | r | d1 | d2 | nλ1 | nλ2 | A[1/° C.] | Remarks | Material |
|---|---|---|---|---|---|---|---|---|
| 0 | — | ∞ | ∞ | — | — | | Light source | |
| 1 | ∞ | 1.60 | 1.60 | 1.621214 | 1.579616 | −1.4E−04 | First optical element | Plastic |
| 2 | ∞ | 0.31 | 0.31 | | | | | |
| 3 | 1.2146 | 2.10 | 2.10 | 1.604842 | 1.586051 | 2.6E−06 | Second optical element | Glass |
| 4 | −3.0684 | 0.53 | 0.32 | | | | | |
| 5 | ∞ | 0.10 | 0.60 | 1.621214 | 1.579616 | | Protective layer | |
| 6 | ∞ | — | — | — | — | | | |

Aspherical coefficient

| | Third surface | Fourth surface |
|---|---|---|
| κ | −6.5645E−01 | −9.8912E+01 |
| A4 | 1.6599E−02 | 1.5071E−01 |
| A6 | −1.0595E−03 | −2.6297E−01 |
| A8 | 1.0531E−02 | 3.7356E−01 |
| A10 | −9.6812E−03 | −3.7574E−01 |
| A12 | 2.9401E−03 | 2.0727E−01 |
| A14 | 3.9439E−03 | −4.7039E−02 |
| A16 | −4.3872E−03 | 0.0000E+00 |
| A18 | 1.7585E−03 | 0.0000E+00 |
| A20 | −2.6260E−04 | 0.0000E+00 |

Order of diffraction, manufactured wavelength, optical path difference coefficient of first surface

| | |
|---|---|
| n'1/n'2 | 0/1 |
| λB | 660 |
| B2 | 7.1910E−03 |
| B4 | −2.1498E−03 |
| B6 | 2.8509E−04 |
| B8 | −6.4466E−04 |
| B10 | 1.0100E−04 |

Preferred Embodiment 1

BD: NA1=0.85, λ1=407.7 nm, f1=1.765, m1=0
DVD: NA2=0.65, λ2=660.0 nm, f1=1.825, m2=0

TABLE 3

Paraxial data:

| Surface No. | r | d1 | d2 | nλ1 | nλ2 | A[1/° C.] | Remarks | Material |
|---|---|---|---|---|---|---|---|---|
| 0 | — | ∞ | ∞ | — | — | | Light source | |
| 1 | ∞ | 0.92 | 0.92 | 1.621214 | 1.579616 | −1.4E−04 | First optical element | Plastic |
| 2 | ∞ | 0.31 | 0.31 | | | | | |
| 3 | 1.2146 | 2.10 | 2.10 | 1.604842 | 1.586051 | 2.6E−06 | Second optical element | Glass |
| 4 | −3.0684 | 0.53 | 0.32 | | | | | |
| 5 | ∞ | 0.10 | 0.10 | 1.621214 | 1.579616 | | Protective layer | |
| 6 | ∞ | — | — | — | — | | | |

Aspherical coefficient

| | Third surface | Fourth surface |
|---|---|---|
| κ | −6.5645E−01 | −9.8912E+01 |
| A4 | 1.6599E−02 | 1.5071E−01 |
| A6 | −1.0595E−03 | −2.6297E−01 |
| A8 | 1.0531E−02 | 3.7356E−01 |
| A10 | −9.6812E−03 | −3.7574E−01 |
| A12 | 2.9401E−03 | 2.0727E−01 |
| A14 | 3.9439E−03 | −4.7039E−02 |
| A16 | −4.3872E−03 | 0.0000E+00 |
| A18 | 1.7585E−03 | 0.0000E+00 |
| A20 | −2.6260E−04 | 0.0000E+00 |

Order of diffraction, manufactured wavelength, optical path difference coefficient of first surface

| | |
|---|---|
| n'1/n'2 | 0/1 |
| λB | 660 |
| B2 | 7.1910E−03 |
| B4 | −2.1498E−03 |
| B6 | 2.8509E−04 |
| B8 | −6.4466E−04 |
| B10 | 1.0100E−04 |

Preferred Embodiment 2

BD: NA1=0.85, λ1=407.7 nm, f1=1.765, m1=0
DVD: NA2=0.65, λ2=660.0 nm, f1=1.825, m2=0

TABLE 4

Paraxial data:

| Surface No. | r | d1 | d2 | nλ1 | nλ2 | A[1/° C.] | Remarks | Material |
|---|---|---|---|---|---|---|---|---|
| 0 | — | ∞ | ∞ | — | — | | Light source | |
| 1 | ∞ | 1.40 | 1.40 | 1.621214 | 1.579616 | −1.4E−04 | First optical element | Plastic |
| 2 | ∞ | 0.31 | 0.31 | | | | | |
| 3 | 1.2146 | 2.10 | 2.10 | 1.604842 | 1.586051 | 2.6E−06 | Second optical element | Glass |
| 4 | −3.0684 | 0.53 | 0.32 | | | | | |
| 5 | ∞ | 0.10 | 0.10 | 1.621214 | 1.579616 | | Protective layer | |
| 6 | ∞ | — | — | — | — | | | |

Aspherical coefficient

| | Third surface | Fourth surface |
|---|---|---|
| κ | −6.5645E−01 | −9.8912E+01 |
| A4 | 1.6599E−02 | 1.5071E−01 |
| A6 | −1.0595E−03 | −2.6297E−01 |
| A8 | 1.0531E−02 | 3.7356E−01 |
| A10 | −9.6812E−03 | −3.7574E−01 |
| A12 | 2.9401E−03 | 2.0727E−01 |

TABLE 4-continued

| | | |
|---|---|---|
| A14 | 3.9439E−03 | −4.7039E−02 |
| A16 | −4.3872E−03 | 0.0000E+00 |
| A18 | 1.7585E−03 | 0.0000E+00 |
| A20 | −2.6260E−04 | 0.0000E+00 |

Order of diffraction, manufactured wavelength, optical path difference coefficient of first surface

| | |
|---|---|
| n'1/n'2 | 0/1 |
| λB | 660 |
| B2 | 7.1910E−03 |
| B4 | −2.1498E−03 |
| B6 | 2.8509E−04 |
| B8 | −6.4466E−04 |
| B10 | 1.0100E−04 |

Preferred Embodiment 3

BD: $NA1=0.85$, $\lambda 1=407.7$ nm, $f1=1.765$, $m1=0$
DVD: $NA2=0.65$, $\lambda 2=660.0$ nm, $f1=1.825$, $m2=0$

TABLE 5

Paraxial data:

| Surface No. | r | d1 | d2 | nλ1 | nλ2 | A[1/° C.] | Remarks | Material |
|---|---|---|---|---|---|---|---|---|
| 0 | — | ∞ | ∞ | — | — | | Light source | |
| 1 | ∞ | 1.45 | 1.50 | 1.621214 | 1.579616 | −1.4E−04 | First optical element | Plastic |
| 2 | ∞ | 0.31 | 0.31 | | | | | |
| 3 | 1.2146 | 2.10 | 2.10 | 1.604842 | 1.586051 | 2.6E−06 | Second optical element | Glass |
| 4 | −3.0684 | 0.53 | 0.32 | | | | | |
| 5 | ∞ | 0.10 | 0.10 | 1.621214 | 1.579616 | | Protective layer | |
| 6 | ∞ | — | — | — | — | | | |

Aspherical coefficient

| | Third surface | Fourth surface |
|---|---|---|
| κ | −6.5645E−01 | −9.8912E+01 |
| A4 | 1.6599E−02 | 1.5071E−01 |
| A6 | −1.0595E−03 | −2.6297E−01 |
| A8 | 1.0531E−02 | 3.7356E−01 |
| A10 | −9.6812E−03 | −3.7574E−01 |
| A12 | 2.9401E−03 | 2.0727E−01 |
| A14 | 3.9439E−03 | −4.7039E−02 |
| A16 | −4.3872E−03 | 0.0000E+00 |
| A18 | 1.7585E−03 | 0.0000E+00 |
| A20 | −2.6260E−04 | 0.0000E+00 |

Order of diffraction, manufactured wavelength, optical path difference coefficient of first surface

| | |
|---|---|
| n'1/n'2 | 0/1 |
| λB | 660 |
| B2 | 7.1910E−03 |
| B4 | −2.1498E−03 |
| B6 | 2.8509E−04 |
| B8 | −6.4466E−04 |
| B10 | 1.0100E−04 |

In Tables 1 to 5, the parameters shown are—NA is the numerical aperture, λ (nm) is the design wavelength, f (mm) is the focal length, m is the magnification of the objective lens, r(mm) is the radius of curvature, nλ is the wavelength λ, the refractive index at 25° C., A[1/° C.] is the change in the refractive index when the temperature of the first optical element has increased from 25° C. by 1° C. The aspherical surface is expressed by the following Equation 1 when the deformation from a plane in contact with the apex of that surface is X (h) (mm), the height in a direction perpendicular to the optical axis is h (mm), and the radius of curvature is r (mm). Here, κ is the conical coefficient and A2i is the aspherical coefficient.

Equation 1:
Aspehrical shape equation $$X(h) = \frac{h^2/r}{1+\sqrt{1-(1+\kappa)(h/r)^2}} + \sum_{i=2} A_{2i} h^{2i}$$

Further, the superimposed type diffraction structure and the diffraction structure in each of the preferred embodiments are expressed by the optical path difference assigned by these structures to the transmission wave front. The related optical path difference function is expressed by the optical path difference function $\phi$ (h) (mm) defined by the Equation 2 below where $\lambda$ (nm) is the wavelength of the incident light beam, $\lambda B$ (nm) is the manufacture wavelength, h (mm) is the height in a direction perpendicular to the optical axis, B2j is the optical path difference coefficient, n' is the order of diffraction.

Equation 2:
Optical path function $$\phi(h) = \frac{\lambda}{\lambda_B} \times n' \times \sum_{i=1} B_{2i} h^{2i}$$

TABLE 6

| | Comparison Example | Comparison Example 2 | Preferred Embodiment 1 | Preferred Embodiment 2 | Preferred Embodiment 3 |
|---|---|---|---|---|---|
| Equation (1) | 8.0 | 6.4 | 3.7 | 5.6 | 5.8 |
| Equation (2) | $2.8 \times 10^{-4}$ | $2.2 \times 10^{-4}$ | $1.3 \times 10^{-4}$ | $2.0 \times 10^{-4}$ | $2.0 \times 10^{-4}$ |
| Equation (3) | 0.75 | 0.75 | 0.75 | 0.75 | 0.75 |
| Equation (4) | $2.8 \times 10^{-3}$ | $2.2 \times 10^{-3}$ | $1.3 \times 10^{-3}$ | $2.0 \times 10^{-3}$ | $2.0 \times 10^{-3}$ |

Figure 4:
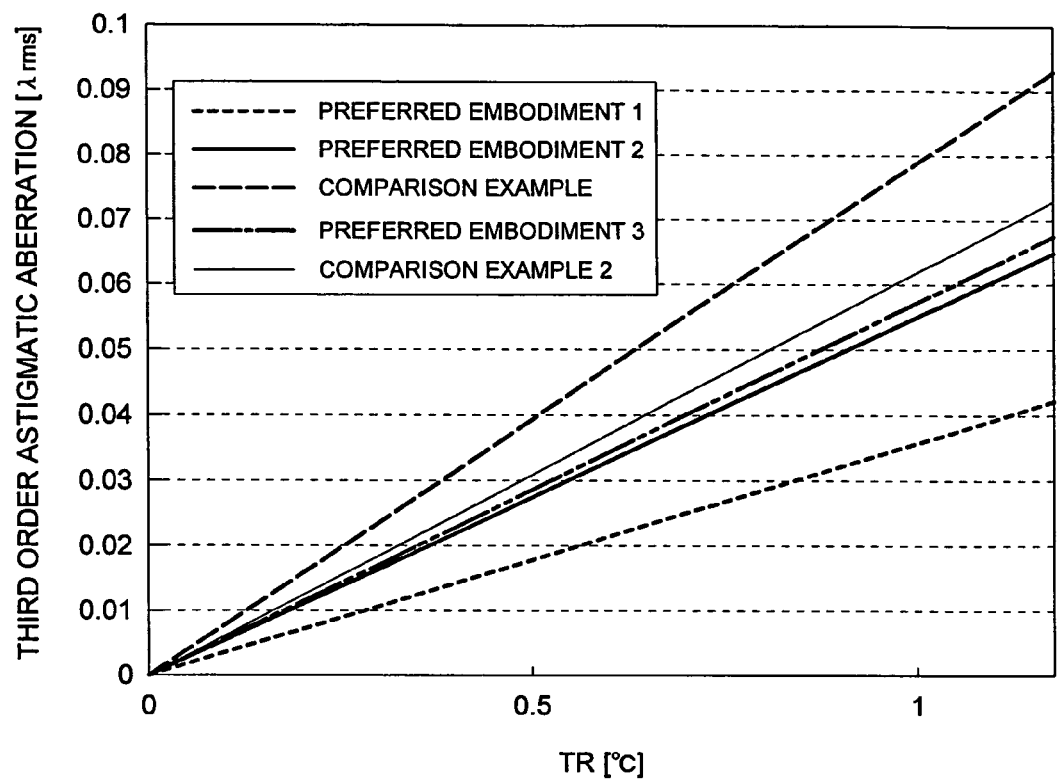
FIG. 4 is a graph showing the relationship between TR and the third order astigmatic aberration in an objective lens in the preferred embodiments 1 to 3 and in the comparison examples 1 and 2.
Figure 5A:
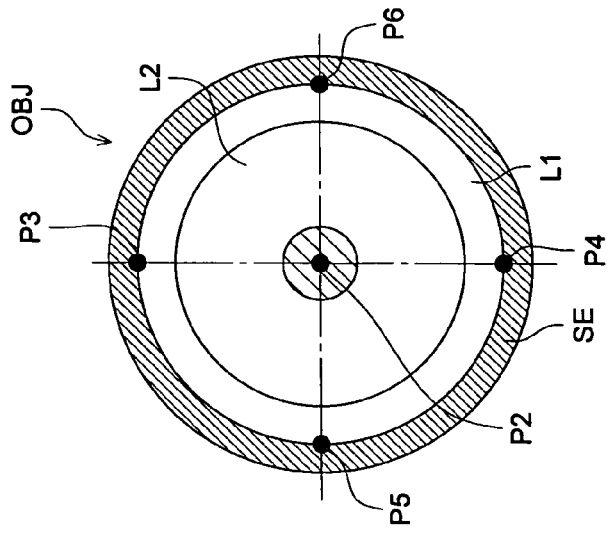
FIG. 5 is a front view (a), a side view (b), and a rear view (c) of an objective lens for explaining "non-uniform temperature distribution".
Figure 5B:
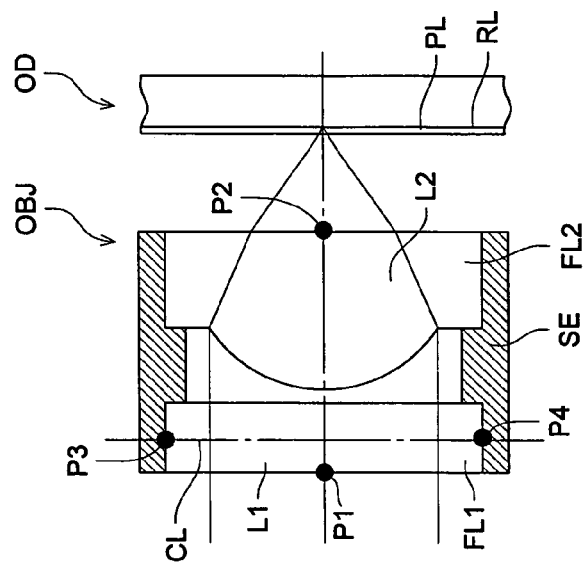
Figure 5C:
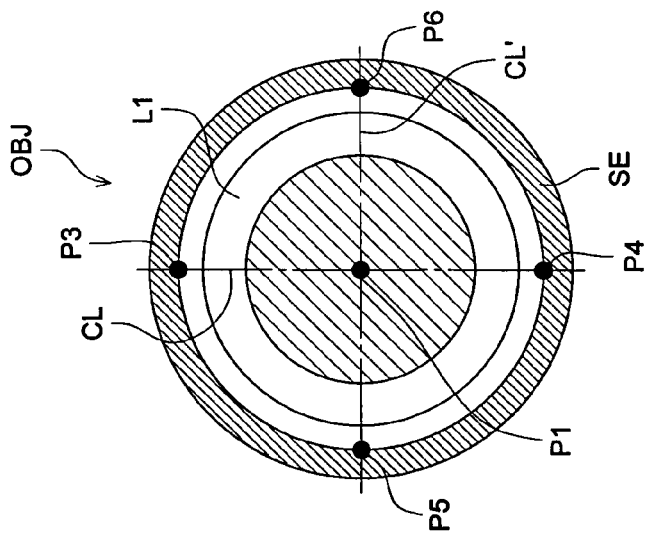
Figure 6:
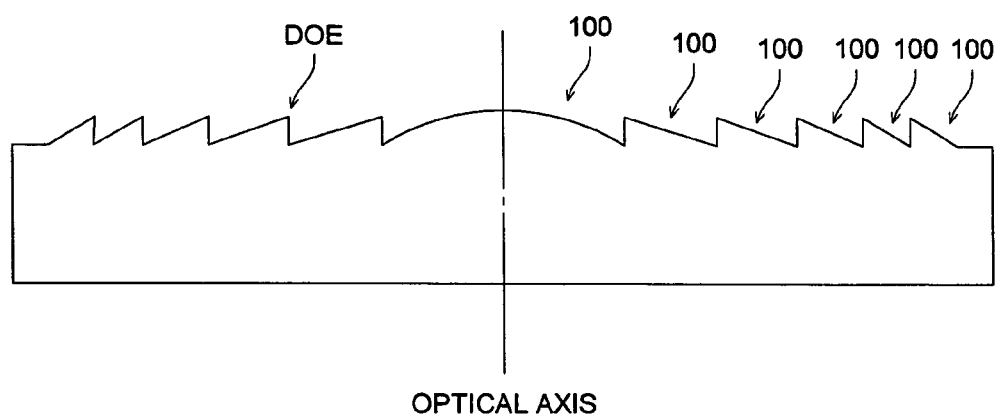
FIG. 6 is side views (a) and (b) showing an example of a phase structure.
Figure 6:
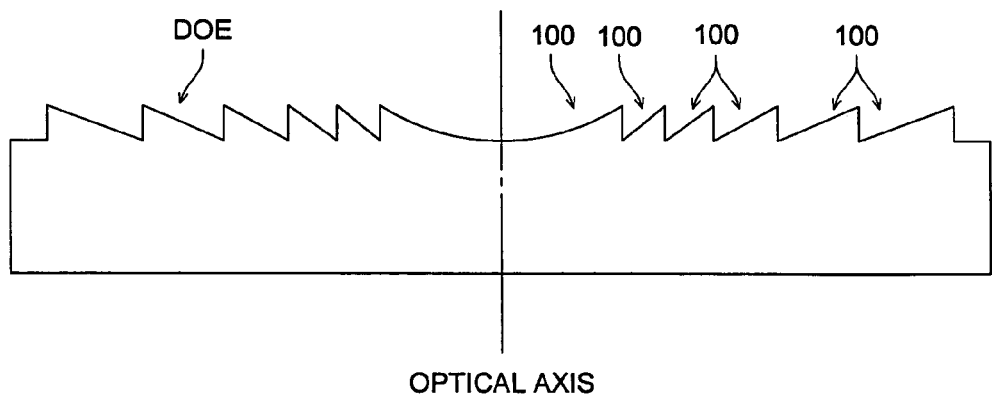
Figure 7:
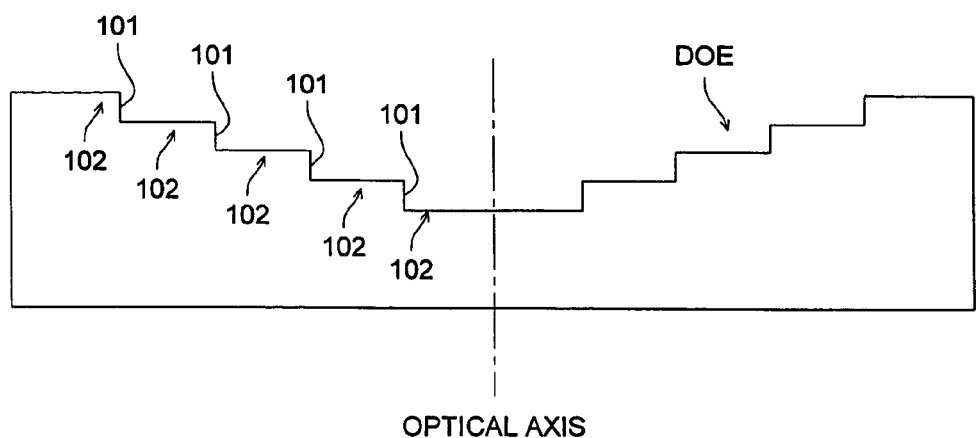
FIG. 7 is side views (a) and (b) showing an example of a phase structure.
Figure 7:
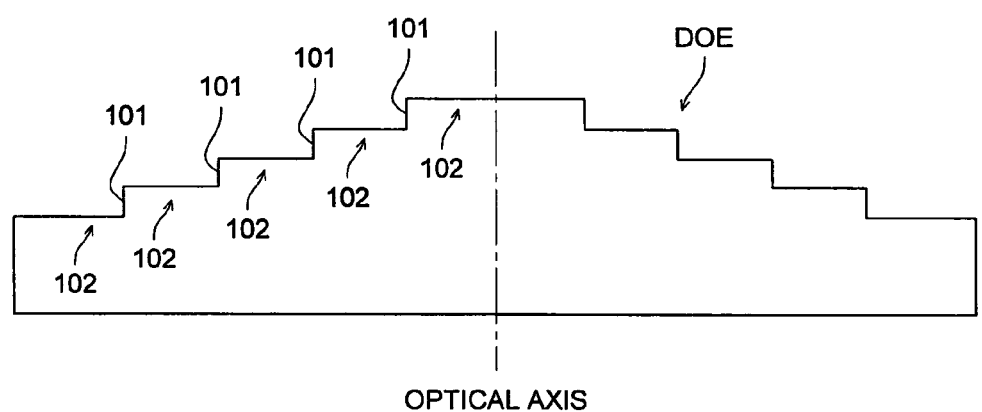
Figure 8A:
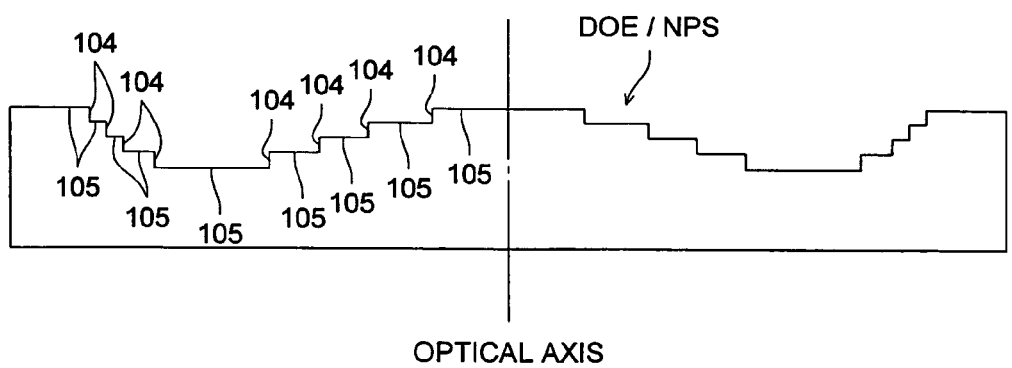
FIG. 8 is side views (a) and (b) showing an example of a phase structure.
Figure 8B:
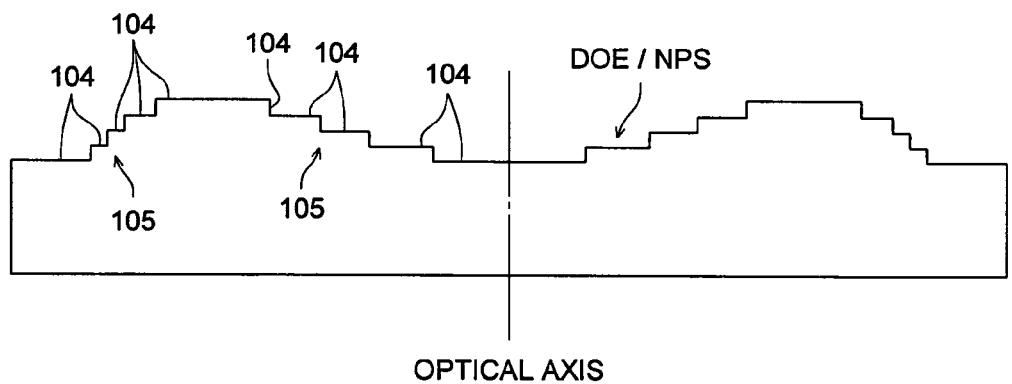

Next, an explanation is given about the temperature distribution. It is possible to treat changes in the temperature of the objective lens as changes in the refractive index. In the present preferred embodiment, we have handled the temperature distribution generated within the objective lens as a refractive index distribution. The method of obtaining the distribution is that of first considering a plane surface of reference that includes the optical axis. Parallel to this plane another plane is considered at a spacing of h. These two planes will always be parallel to the optical axis because the reference plane includes the optical axis. We carried out simulation taking the temperatures (the refractive index) at each position where these two planes intersect with the first optical element and the second optical element to be the same, and also so that this temperature increases with h proportional to the second power of h. Further, since optical axis has rotational symmetry and the temperature distribution in the direction of the optical axis does not contribute to the generation of astigmatic aberration, the temperature distribution along the optical axis has not been considered during this simulation. FIG. 4 is the result of obtaining the amount of change in the third order astigmatic aberration when the external diameter of the first optical element is 4.0 mm, the average value of the center temperature is TC (=T1=T2), and TR (=TP) has changed up to 0° C. to 1.18° C. in the condition in which the difference TR with TH and the temperature difference TP between TH and TL are the same. In addition, from the results of temperature measurement, since the quantity of current passed through the tracking coil and the focusing coil when a temperature difference of 1.18° C. is generated corresponds to 2.5 times the normal speed, we calculated taking the value of x in Equation (3) of Table 6 as 2.5.

In addition, in this calculation, only the changes in the refractive index distribution associated with the changes in the temperature distribution of the objective lens, but the changes in the wavelength of oscillation of the laser light source due to changes in the ambient temperature have not been taken in to consideration.

In other words in the present simulation, the refractive index distributions $N_{L1}$(h) and $N_{L2}$(h) assigned within the first optical element and within the second optical element are expressed as follows as functions of the height above the optical axis.

$$N_{L1}(h) = N_{0L1} + N_{h2L1} \ldots h^2$$

$$N_{L2}(h) = N_{0L2} + N_{h2L2} \ldots h^2$$

Here, $N_{0L1}$ and $N_{0L2}$ are the changes in the refractive index with respect to h within the first optical element and within the second optical element within the above reference plane containing the optical axis (h=0). The concrete numeric values for the preferred embodiment 1 regarding the above equation become as follows.

In the preferred embodiment 1 when the temperature difference between the center (h=0) and the outer periphery (h=2.0) is 1.18° C., since the change in the refractive index when the temperature of the first optical element has increased from 25° C. by 1° C. is −1.4E−4, the refractive index $N_{L1}$(h=2.0) at the outer periphery (h=2.0) becomes 1.621214−1.4E−4×1.18=1.621048.

Therefore, the rate of change $N_{h2L1}$ of the refractive index with respect to h becomes Nh2L1=−4.14E−5 from the equation 1.621048=1.621214+$N_{h2L1}$·2.0². Calculating similarly for the second optical element yields $N_{h2L2}$=7.69E−7. The amount of change in the $3^{rd}$ order astigmatic aberration is shown in FIG. 4 when a temperature distribution is present in the objective lens due to this rate of change of refractive index.

In FIG. 4, in the comparison example which does not satisfy Equation (1) and Equation (2), in the state in which during the process of the above temperature distribution the temperature difference is 1.18° C. between the center of the objective lens and the hottest part on the outermost periphery, that is, in the state corresponding to carrying out information recording/reproduction at 2.5 times the normal speed, the change in the $3^{rd}$ order astigmatic aberration is 0.093[$\lambda$rms] thereby losing the diffraction limit. In addition, in the comparison example 2, under similar conditions, the change in the $3^{rd}$ order astigmatic aberration is 0.074[$\lambda$rms] thereby losing the diffraction limit.

In contrast with this, the preferred embodiments 1 to 3 that satisfy Equation (1) and Equation (2) show that the quantity of generation of $3^{rd}$ order astigmatic aberration has been suppressed.

From these results, it can be said that, by satisfying Equation (1) and Equation (2), in the objective lenses of the preferred embodiments 1 to 3, the amount of change of the astigmatic aberration has been suppressed to a small value even when a non-uniform temperature distribution has been generated within the objective lens due to heat generation from the actuators, and the objective lens has sufficient performance capabilities as the objective lens for optical pick-up devices for high-density optical disks.

It is to be noted that various changes and modifications will be apparent to those skilled in the art. Therefore, unless such changes and modifications depart from the scope of the present invention, they should be construed as being included therein.

What is claimed is:

1. An objective lens for optical pick-up devices comprising:
   a first optical element placed on a light source side; and
   a second optical element having light focusing characteristics and placed on an optical information recording medium side,
   wherein the objective lens satisfies the following Equation (1):

$$0.1 < D \times \tau < 6 \quad (1)$$

where, $\tau$ [mm] is spacing along an optical axis between an optical surface on the light source side of the first optical element and an optical surface on the optical information recording medium side of the first optical element; and
   D [mm] is an external diameter of the first optical element.

2. An objective lens of claim 1, wherein the objective lens satisfies the following Equation (2):

$$2.0 \times 10^{-6} < \tau \times |A| \times (h2/h1)^2 < 2.1 \times 10^{-4} \quad (2)$$

where, A is amount of change in refractive index of the first optical element for a 1° C. temperature raise from 25° C.,
   h1 is height from an optical axis of marginal light beam at the optical surface on the light source side of the first optical element, and
   h2 is height from the optical axis of the marginal light beam at the optical surface on the optical information recording medium side.

3. An objective lens of claim 1, wherein the objective lens satisfies the following Equation (3):

$$0.52 < E/D < 0.97 \quad (3)$$

Where, E is an effective diameter of the optical surface of the first optical element on the light source side.

4. An objective lens of claim 1, wherein the objective lens satisfies the following Equation (4):

$$5.0 \times 10^{-6} < D \times \tau \times |A| < 2.1 \times 10^{-3} \quad (4)$$

where, A is amount of change in refractive index of the first optical element for a 1° C. temperature raise from 25° C.

5. An objective lens of claim 1, wherein the second optical element is made of glass.

6. An objective lens of claim 1, wherein the first optical element is made of plastic.

7. An objective lens of claim 1, wherein the first optical element has a phase structure on at least one of the optical surfaces of the first optical element.

8. An objective lens of claim 1, wherein the objective lens satisfies the following Equation.

$$1 < D < 8$$

9. An objective lens of claim 1, wherein the objective lens satisfies the following Equation.

$$0.1 < \tau < 3.0$$

10. An objective lens for optical pick-up devices comprising:
    a first optical element placed on a light source side; and
    a second optical element having light focusing characteristics and placed on an optical information recording medium side,
    wherein the objective lens satisfies the following Equation (2):

$$2.0 \times 10^{-6} < \tau \times |A| \times (h2/h1)^2 < 2.1 \times 10^{-4} \quad (2)$$

where, $\tau$ [mm] is spacing along an optical axis between an optical surface on the light source side of the first optical element and an optical surface on the optical information recording medium side of the first optical element,
    A is amount of change in refractive index of the first optical element for a 1° C. temperature raise from 25° C.,
    h1 is height from an optical axis of marginal light beam at the optical surface on the light source side of the first optical element, and
    h2 is height from the optical axis of the marginal light beam at the optical surface on the optical information recording medium side.

11. An objective lens of claim 10, wherein the objective lens satisfies the following Equation (3):

$$0.52 < E/D < 0.97 \quad (3)$$

Where, D [mm] is an external diameter of the first optical element, and
    E is an effective diameter of the optical surface of the first optical element on the light source side.

12. An objective lens of claim 10, wherein the objective lens satisfies the following Equation (4):

$$5.0 \times 10^{-6} < D \times \tau \times |A| < 2.1 \times 10^{-3} \quad (4)$$

where, A is amount of change in refractive index of the first optical element for a 1° C. temperature raise from 25° C.

13. An objective lens of claim 10, wherein the second optical element is made of glass.

14. An objective lens of claim 10, wherein the first optical element is made of plastic.

15. An objective lens of claim 10, wherein the first optical element has a phase structure on at least one of the optical surfaces of the first optical element.

16. An optical pick-up device comprising:
    an objective lens having a first optical element placed on a light source side and a second optical element having light focusing characteristics and placed on an optical information recording medium side,
    wherein the objective lens satisfies the following Equation (1):

$$0.1 < D \times \tau < 6 \quad (1)$$

where, $\tau$ [mm] is spacing along an optical axis between an optical surface on the light source side of the first optical element and an optical surface on the optical information recording medium side of the first optical element; and
    D [mm] is an external diameter of the first optical element.

17. An optical pick-up device of claim 16, further comprising:
    an actuator which drives the objective lens.

18. An optical pick-up device of claim 17, wherein the actuator is mounted in a non-circularly symmetrical manner with respect to the optical axis of the objective lens.

19. An optical pick-up device comprising:
    an objective lens having a first optical element placed on a light source side and a second optical element having light focusing characteristics and placed on an optical information recording medium side, wherein the objective lens satisfies the following Equation (2):

$$2.0\times10^{-6} < \tau \times |A| \times (h2/h1)^2 < 2.1\times10^{-4} \qquad (2)$$

where, $\tau$ [mm] is spacing along an optical axis between an optical surface on the light source side of the first optical element and an optical surface on the optical information recording medium side of the first optical element, A is amount of change in refractive index of the first optical element for a 1° C. temperature raise from 25° C., h1 is height from an optical axis of marginal light beam at the optical surface on the light source side of the first optical element, and h2 is height from the optical axis of the marginal light beam at the optical surface on the optical information recording medium side.

20. An optical pick-up device of claim 19, further comprising:
an actuator which drives the objective lens.

21. An optical pick-up device of claim 20, wherein
the actuator is mounted in a non-circularly symmetrical manner with respect to the optical axis of the objective lens.

22. An optical information recording and/or reproducing apparatus comprising:
an optical pick-up device having an objective lens, wherein the objective lens have a first optical element placed on a light source side and a second optical element having light focusing characteristics and placed on an optical information recording medium side, and satisfies the following Equation (1):

$$0.1 < D \times \tau < 6 \qquad (1)$$

where, $\tau$ [mm] is spacing along an optical axis between an optical surface on the light source side of the first optical element and an optical surface on the optical information recording medium side of the first optical element; and D [mm] is an external diameter of the first optical element.

23. An optical information recording and/or reproducing apparatus comprising:
an optical pick-up device having an objective lens, wherein the objective lens have a first optical element placed on a light source side and a second optical element having light focusing characteristics and placed on an optical information recording medium side, and satisfies the following Equation (2):

$$2.0\times10^{-6} < \tau \times |A| \times (h2/h1)^2 < 2.1\times10^{-4} \qquad (2)$$

where, $\tau$ [mm] is spacing along an optical axis between an optical surface on the light source side of the first optical element and an optical surface on the optical information recording medium side of the first optical element, A is amount of change in refractive index of the first optical element for a 1° C. temperature raise from 25° C., h1 is height from an optical axis of marginal light beam at the optical surface on the light source side of the first optical element, and h2 is height from the optical axis of the marginal light beam at the optical surface on the optical information recording medium side.

* * * * *